Jan. 22, 1963 R. M. SKALLERUP 3,074,166

METHOD AND APPARATUS FOR USE IN CORRECTIVE DENTAL WORK

Filed Sept. 8, 1959 4 Sheets-Sheet 1

INVENTOR.
Robert M. Skallerup
BY: Olson & Trexler
attys.

INVENTOR.
Robert M. Skallerup
BY: Olson & Trexler
Attys.

Jan. 22, 1963 R. M. SKALLERUP 3,074,166
METHOD AND APPARATUS FOR USE IN CORRECTIVE DENTAL WORK
Filed Sept. 8, 1959 4 Sheets-Sheet 3
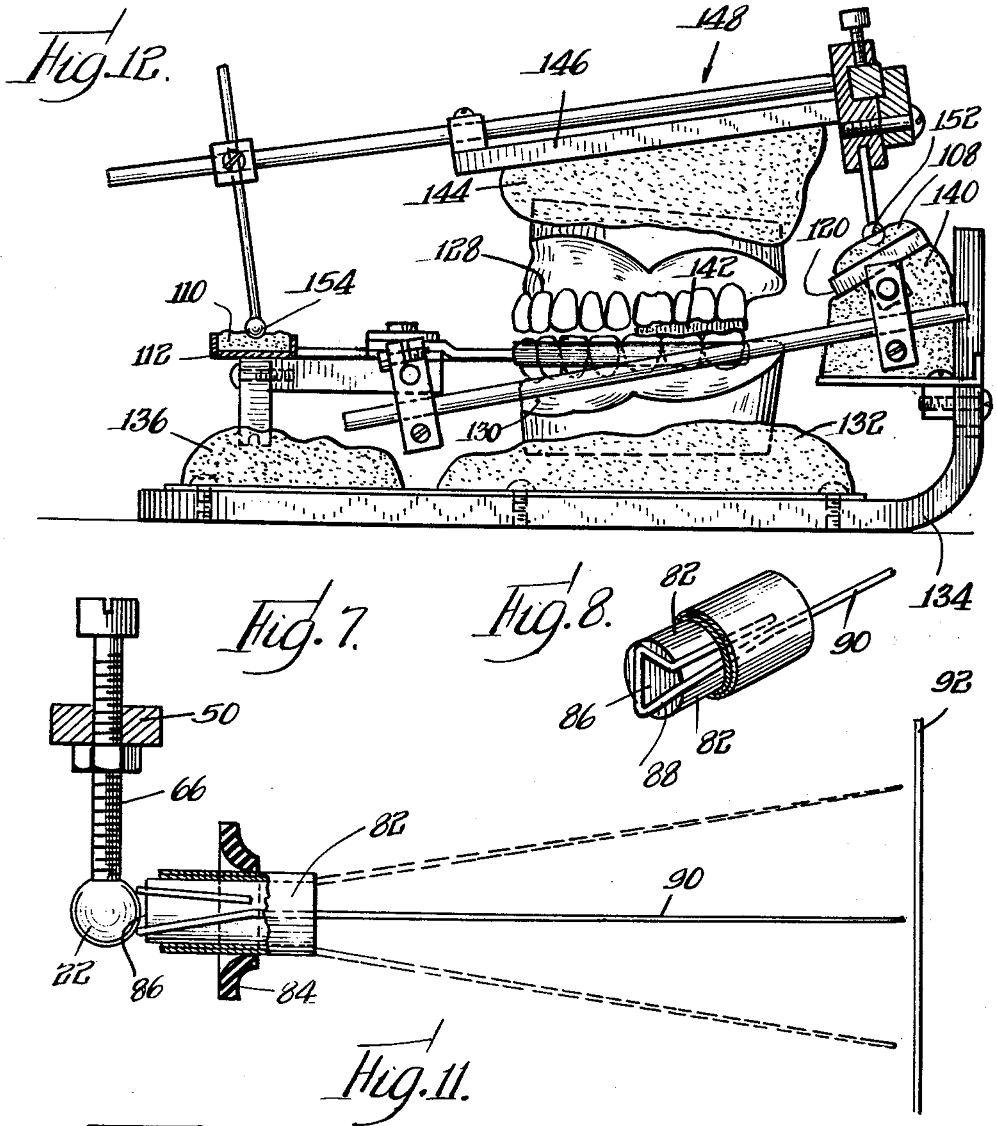
Fig. 12. Fig. 7. Fig. 8. Fig. 11.
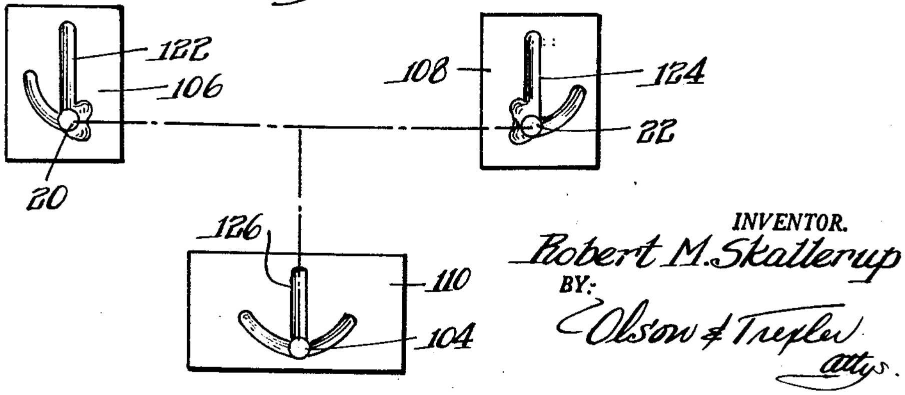
INVENTOR.
Robert M. Skallerup
BY:
Olson & Trexler
attys.

Jan. 22, 1963 R. M. SKALLERUP 3,074,166

METHOD AND APPARATUS FOR USE IN CORRECTIVE DENTAL WORK

Filed Sept. 8, 1959 4 Sheets-Sheet 4

INVENTOR.
Robert M. Skallerup
BY: Olson & Trexler
Attys.

United States Patent Office 3,074,166
Patented Jan. 22, 1963

3,074,166

METHOD AND APPARATUS FOR USE IN CORRECTIVE DENTAL WORK

Robert M. Skallerup, 1511 W. Oakton St., Arlington Heights, Ill.

Filed Sept. 8, 1959, Ser. No. 838,591
16 Claims. (Cl. 32—19)

The present invention relates to the art of dentistry and is concerned particularly with studies of the kinematic action of the human jaw and the relative kinematic action of the upper and lower dentition of a person and with the artificial reproduction by means of models of the relative kinematic action of the upper and lower dentition of a dental patient for the purposes of diagnosis and the development of therapeutic measures and corrective devices.

This field of dentistry is complicated by a number of factors, which include the infinite variation in the form and shape of the upper and lower dentition of different individuals and the inherently complex character of the movements of the human jaw which affect the relative kinematic action of the upper and lower dentition of the individual. Thus, movement of the jaw, as in chewing, comprises a swinging movement of the jaw about its hinge axis, which is compounded by a nonuniform lateral displacement of the hinge axis of the jaw as the swinging movement of the jaw progresses. Other movements of the jaw, such, for example, as lateral jaw movements when the upper and lower teeth are in proximate relation to each other, are even more complex.

In addition to the patterns of jaw movements that may be regarded as "normal" there are many other patterns of jaw movement that are "abnormal" or faulty.

Abnormal jaw movements arise from a variety of causes and can create or complicate other jaw and mouth problems and difficulties for the patient. In some instances improper jaw movements arise from faulty chewing habits. Frequently, improper jaw movements are caused by or result in wear or other abnormalities in the joint structure of the jaw. This can involve damage to the tooth structure and sometimes creates conditions which produce an annoying audible popping of the jaw during chewing.

To properly diagnose and treat ailments and difficulties arising from improper or faulty jaw movements it is necessary for the dentist to make a study of such movements in conjunction with the specific character of the upper and lower dentition of the patient. Even when the jaw movements of a patient are normal as such, the specific character of such movements must be taken into account in making and fitting to the patient such corrective devices as dentures, bridges, and the like.

Previously, the procedures for doing this have been characteristically inaccurate and in many respects unsatisfactory. Moreover, prior methods, procedures and apparatus used for this purpose have required that the dentist spend an inordinate amount of time working in the patient's mouth. This has not only been uncomfortable for the patient but it has been tedious, vexing work for the dentist who must compensate as best he can for the inaccurate character of the methods and procedures used.

One object of the invention is to provide an improved method and apparatus for artificially reproducing by means of models the kinematic relative action of the upper and lower dentition of a dental patient.

Another object is to provide, for use in studying the kinematic character of the jaw movements of the dental patient, an improved method and apparatus for locating the instantaneous position of the hinge axis of the jaw with great accuracy and precision.

Another object is to provide, for use in the diagnostic study of the jaw movements of the dental patient, an improved method and apparatus for providing clearly visible indications or traces which correctly depict in a meanful pattern the character of the jaw motions.

A further object is to provide an improved method and apparatus which enables the dental technician working in the laboratory to produce and refine the shaping of corrective dental devices, such as dentures and bridgework, to fit the patient's mouth and mesh correctly with opposing teeth with an accuracy and precision which greatly minimizes and virtually eliminates any necessity for final fitting of the devices in the patient's mouth.

Another object is to provide an improved method and apparatus which enables the dentist to achieve the ends recited in the preceding objects in a manner which greatly reduces the time which the dentist must spend working in the patient's mouth.

Still another object is to provide an improved method and apparatus as recited in the preceding objects which can be used without extensive training to achieve the ends recited in the foregoing objects.

An additional object is to provide an improved method and apparatus of the above character which markedly increases the efficiency of the dentist and correspondingly reduces the cost in providing the patient with therapeutic measures and corrective dental devices of the character previously mentioned.

Other objects and advantages will be evident from the following description of the invention taken in relation to the accompanying drawings, in which:

FIG. 7 is an enlarged fragmentary sectional view illustrating the coaction of a stylus with motion amplifying means used in determining a state of coincidence of the styli with the jaw hinge axis;

FIG. 8 is an enlarged perspective view of magnet and indicator structure of the motion amplifying means used in locating a stylus;

FIG. 11 is a plan view showing traces made of movements of a jaw having a normal motion pattern;

FIG. 12 is a side elevational view of apparatus used in artificially producing by means of models the kinematic relative action of the upper and lower dentition of the patient.

As intimated, the matter of locating the instantaneous hinge axis of the human jaw, prior to this invention, has been a tedious, time consuming procedure requiring great skill, judgment and effort on the part of the dentist.

Moreover, the methods and devices previously used for this purpose have been inexact and have not produced precise results.

As will presently appear, the instantaneous hinge axis of the dental patient is located in accordance with the present invention with great precision in a manner which remarkably minimizes the skill and time required to accurately locate the hinge axis.

For this purpose, a pair of spherical ball elements 20, 22 are adjustably supported on opposite sides of the head of the patient in general alinement with the hinge axis of the jaw. As will presently appear, means are provided for effecting a precise location of each ball element 20, 22 on the instantaneous hinge axis of the jaw.

In this connection, it will be appreciated that the instantaneous hinge axis of the jaw, which is the instantaneous center or axis of instantaneous swinging movement of the jaw, does not move relative to either the upper or lower dentition of the person as the jaw swings through small increments of angular motion.

It is fitting to mention here that the term "upper dentition" as used in this application denotes the upper teeth and gum structure of an individual and that the term "lower dentition" denotes the lower teeth and gum structure of the individual. In the claims the term "convenience position" is used to denote that position of the patient's jaw illustrated in FIG. 3 in which there is a closely proximate, substantially occluding relationship of the upper and lower dentition.

Figures 1, 2:
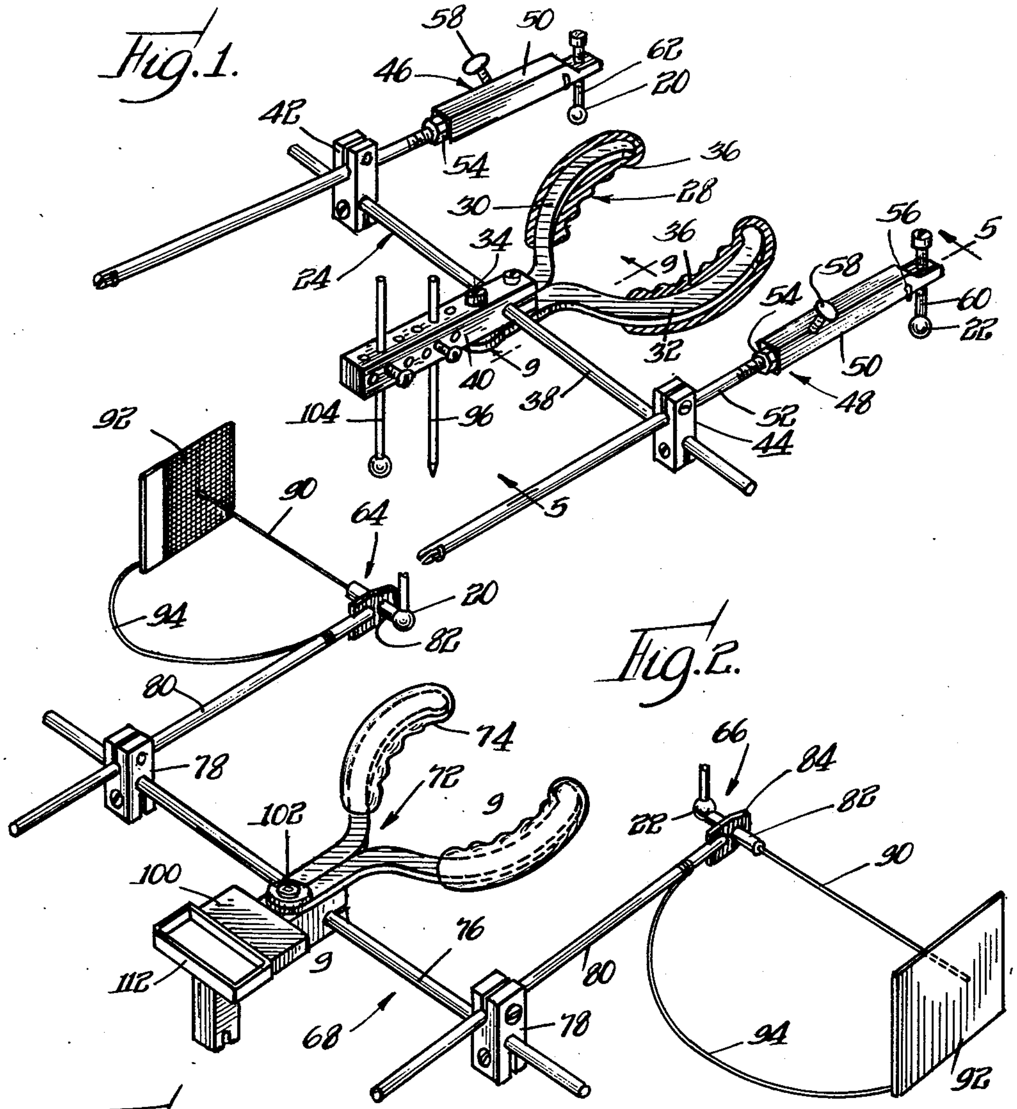
FIGURE 1 is a perspective view of the styli support structure provided and used in accordance with the invention.
FIG. 2 is a perspective view of structure used in locating the styli in coincidence with the hinge axis of the patient's jaw.
Figure 5:
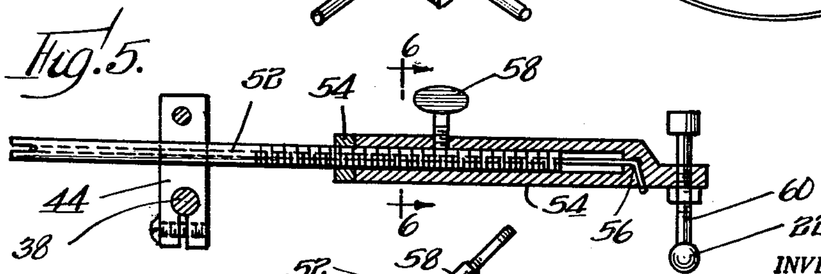
FIG. 5 is a fragmentary longitudinal sectional view taken along the line 5—5 of FIG. 1.
Figure 6:
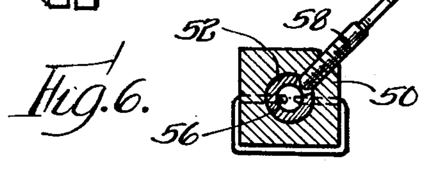
FIG. 6 is a fragmentary sectional view taken along the line 6—6 of FIG. 5.
Figures 3, 4, 9, 10:
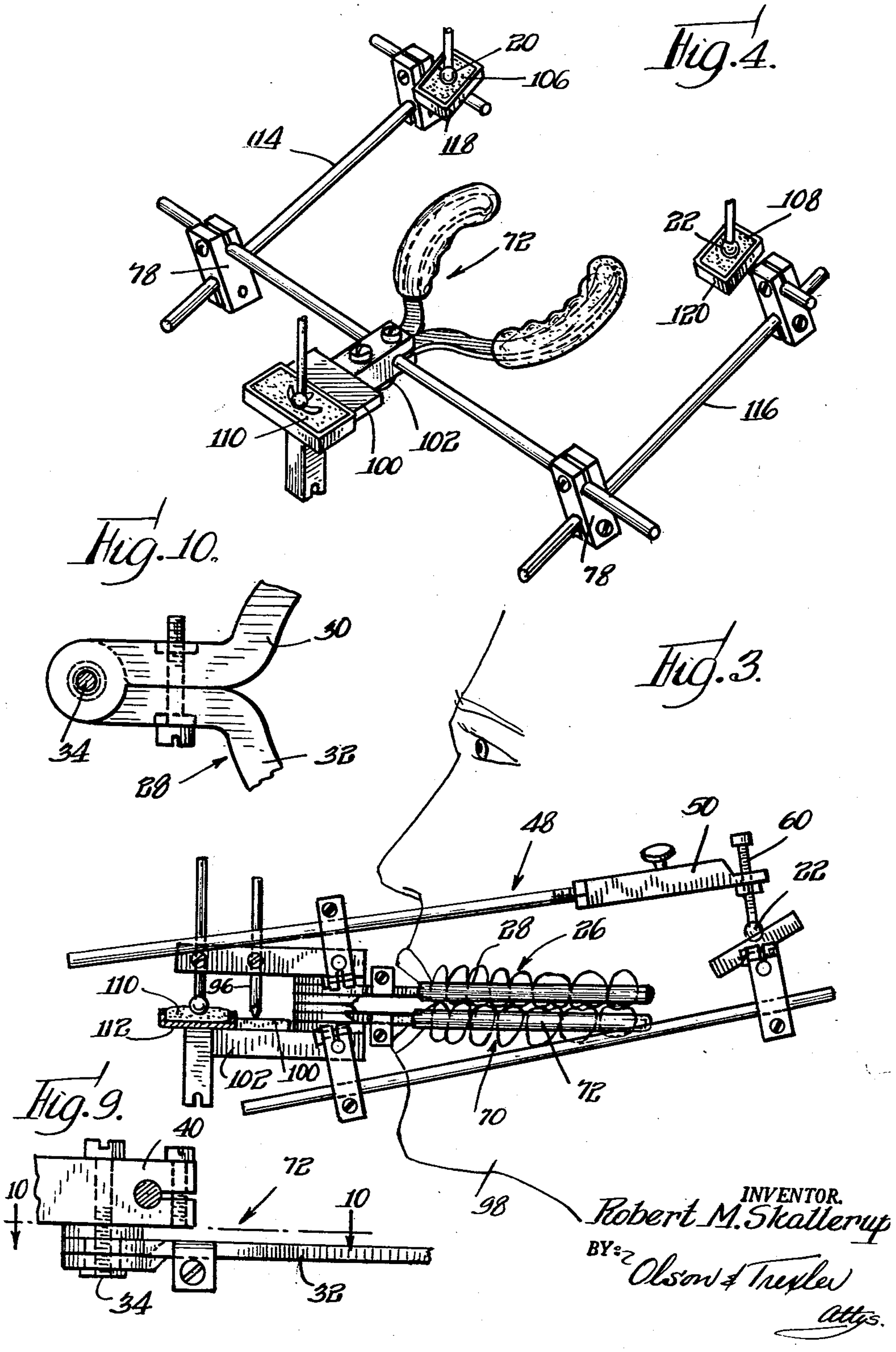
FIG. 3 is a side elevational view showing the apparatus fitted to the patient to make traces of critical jaw movements.
FIG. 4 is a perspective view of jaw movement tracing structure which is used in the manner illustrated in FIG. 3.
FIG. 9 is a fragmentary sectional view taken along the line 9—9 of FIG. 1.
FIG. 10 is a plan view of structure appearing in FIG. 9.

Having reference to FIGS. 1 and 3, the two ball elements 20, 22 are firmly yet adjustably supported on opposite sides of the patient's head as recited by means of a generally U-shaped upper bow 24 which is firmly supported on the upper dentition 26 of the patient, as shown in FIG. 3, by means of a dental clutch or clamp 28. The clamp 28, itself, is of a conventional construction and comprises a pair of opposed rearwardly extending jaws 30, 32 mutually pivoted for swinging movement toward and away from each other about a common pivot 34. Each jaw 30, 32 carries a thick cover 36 of a deformable material adapted to mold itself into interfitting relation to the teeth against which the jaws are clamped. Moreover, the deformable material on the jaws takes a set or shape conforming to that of the teeth which is of advantage, as will presently appear, in subsequently relocating the clutch 28 on a model of the patient's dentition to reproduce in relation to the model the positional relationship of the clutch to the natural dentition to which it is applied.

As shown, the upper bow 24 comprises a transverse cross-bar 38 supported by a clamp element 40 on the forward end of the clutch 28. Two adjustable clamps 42, 44 supported on the bar 38, for adjustment laterally toward and away from the clutch 28, support two elongated support elements, 46, 48 in laterally spaced relation to each other to project rearwardly of the cross-bar 38 to an extent which can be determined by longitudinal adjustment of the support elements in the respective clamps 42, 44.

The ball elements 20, 22 are supported on the rear end of the respective support elements 46, 48.

As previously intimated, the ball elements 20, 22 are positioned in an approximated or general alinement with the hinge axis of the jaw. An initial, rough positioning of each of the ball elements is accomplished by adjusting its elongated support element longitudinally within the coacting one of the support clamps 42, 44 and rotatably about the axis of the transverse bar 38. These adjustments of the elongated support elements 46, 48 provide a quick adjustment of the ball elements 20, 22 in both horizontal and vertical directions and are easily effected upon loosening of the supporting clamps 40, 42 and 44. The clamps, of course, are retightened after the desired adjustments are completed.

A rough positioning of the ball elements 20, 22, as described, to have a general or approximate alinement with the hinge axis of the jaw is accomplished by a visual alinement of the ball elements with the gross anatomical features of the head of the patient. Accurate final positioning of the ball elements 20, 22 to effect a precise alinement of the centers of the ball elements with the hinge axis of the jaw is accomplished in accordance with the invention in a manner to be described presently.

Final adjustment of each ball element 20, 22 in the manner to be described is facilitated by fine adjustment means incorporated into each of the support elements 46, 48 and having a construction which enables the dentist to readily effect adjustment of each ball through infinitely small increments. Thus, the ball 22, for example, is supported on the rear end of a sleeve 50 slidably mounted on the rear end of a threaded rod 52 forming a component part of the support element 48. The sleeve 50 is continuously biased axially toward the forward end of the rod 52 to abut against an adjusting nut 54 on the threaded rod. In this instance, the sleeve 50 is urged toward the forward end of the rod 52 by a rubber tension element 56 connected to the rear end of the sleeve, as shown in FIG. 1, and extending axially through the rod, which is hollow, to be supported or anchored at the forward end of the rod. Thus, incremental longitudinal adjustments of the sleeve 50 in either direction can be effected by a simple rotary movement of the adjusting nut 54. The sleeve 50 is locked in the longitudinally adjusted position by a thumb screw 58 extending through the sleeve into engagement with the rod 52, as shown.

The described support sleeve and adjusting structure for the ball element 22 is duplicated for the ball element 20 and identified in the drawings with the same reference numerals.

Fine adjustment of the ball element 22 in a direction perpendicular to the axis of the sleeve 50 is effected by rotary adjustment of a support screw or stem 60 for the ball element which is threadably supported in the rear end of the sleeve 50 in perpendicular relation to the axis of the sleeve. The ball element 22 is formed integrally on the lower end of its threaded support 60 which together with the ball element constitute a stylus that is used in accordance with the invention in a manner to be described presently. Similarly, the ball element 20 is formed on the lower end of a threaded stem 62 which together with the ball element 20 forms a second stylus.

Aside from the described means for physically adjusting the positions of the ball elements 20, 22 with reference to the upper dentition 26 of the patient, precise positioning of the ball elements in alinement with the hinge axis is effected in accordance with the invention with the aid of a pair of motion amplifying reference elements 64, 66 supported on a lower bow 68, as shown in FIG. 2, for coaction with the respective ball elements.

The lower bow 68 is firmly mounted on the lower dentition 70, FIG. 3, of the patient by means of a dental clutch or clamp 72 similar in its construction and operation to the previously described dental clamp 28. The jaws of the clamp 70 carry a deformable material 74, similar to that carried by the clamp 28, which receives an impression of the lower dentition 70.

Structurally, the lower bow 68 comprises a transverse cross-bar 76 supported on the clutch 72 and mounting a pair of laterally adjustable clamps 78 which supports a pair of rearwardly extending support elements 80. The rear ends of the support elements 80 respectively support the previously mentioned motion amplifying reference elements 64, 66 in positions which are adjusted into alinement with the respective ball elements 20, 22 through adjustments made in the clamps 78.

The two motion amplifying reference elements 64, 66 are identical in construction. The reference element 66, for example, comprises the permanent magnet 82, FIGS. 2, 7 and 8, supported on the coacting support element 80 by means of a pliable connecting web 84 which supports the weight of the magnet while at the same time providing for universal movement of the magnet relative to the coacting support element 80. Thus, the magnet 82 is free to pivot in any direction and to move a limited distance longitudinally in the direction of the coacting ball element 22.

The magnet 82 is adjusted into alinement with the ball element 22, as described, and is magnetically attracted into firm engagement with the ball element. An effectively concave ball receiving socket 86 is formed on the ball element end of the magnet 82 to engage the opposing surface of the ball element, as shown in FIG. 7, to effect and maintain an alinement of the center of the ball element with the axis of the magnet.

Preferably, the ball element receiving socket 86 is formed on the magnet 82 by a length of wire 88 shaped into the general form of a triangle and secured to the end of the magnet as shown in FIG. 8. This eliminates any need for machining the magnet 82 to form the socket.

Moreover, the same length of wire 88 which is shaped and secured to the magnet 82 to form the socket 86 as described is extended beyond the end of the magnet 82 opposite from the socket 86 to form a projecting indicator element 90, FIGS. 2 and 7, having a length many times greater than the spacing of the universal magnet support 84 from the center of the ball element 22.

The free end of the indicator element 90 projects into close proximity to a target or reference element 92 mounted on the adjacent support element 80 by means of a cantilever 94. Preferably, the cantilever 94 is fashioned from a deformable wire, or the like, which provides for adjustment of the target 92 into coacting relation to the projecting end of the indicator element.

The component parts of the reference element 66 just described are duplicated in the reference element 64 and are identified by the same reference numbers in the drawings.

After the upper and lower bows 24, 68 are mounted on the upper and lower dentition 26, 70 and adjusted in the manner described, a limit stop 96 is adjusted to terminate closing movement of the patient's jaw 98, FIG. 3, just short of tooth contact.

The adjustable stop 96 used for this purpose is located forwardly of the patient's face and is supported on the clamp 40 of the upper bow 24 for vertical adjustment toward and away from an opposing anvil plate or abutment mounted on a clamp 102 which supports the lower bow 68 on the clutch 72.

At this point, the dentist induces the patient to relax his jaw muscles to allow the dentist to freely manipulate the jaw and the lower dentition 70 in relation to the upper dentition 26.

The dentist then pivots or swings the jaw about its hinge axis through very small angles in the vicinity of the previously determined position just short of tooth contact. It may be assumed that in nearly all instances the ball elements 20, 22 as initially positioned in the manner described will be somewhat off center with respect to the jaw hinge axis. Consequently, the swinging of the jaw through a small angle will produce movement of the ball elements 20, 22 in relation to the pivotal centers of the universal supports for the magnets 82 of the reference elements 64, 66. The effect is to produce an angular mov ment of the respective magnets 82 which is proportional to the degree to which the respective ball elements 20, 22 are laterally displaced from the jaw hinge axis. Angular movement of the magnets 82 is transmitted through the indicator elements 90 to effect displacements of the projecting ends of these elements relative to the targets 92 which are accurate magnifications of the displacement of the ball elements relative to the magnet supports 80.

The position of each ball element 20, 22 on the upper bow 24 is adjusted by means of the incremental fine adjustment structure described until the coacting indicator elements 90 do not move in relation to the targets 92 as the jaw 98 is rotated through a small angle. When the indicating elements 90 no longer move in relation to the targets 92 the dentist is assured that the centers of the ball elements 20, 22 are in precise alinement with the jaw hinge axis.

Thus, accurately positioned in alinement to the hinge axis of the jaw 98, the ball elements 20, 22 are used in making styli tracings recording the pattern of critical movements of the jaw which are meanful to the dentist in studying the jaw action for diagnosis and in arriving at therapeutic measures. Moreover, the styli tracings are used, as will presently appear, in accurately reproducing by means of models the kinematic relative action of the upper and lower dentition 26, 70 of the patient.

The two ball elements 20, 22 constitute, as previously mentioned, the free ends of two recording styli which, for convenience, are denoted here by the same reference numbers.

For jaw movement recording purposes, a third stylus 104 is mounted forwardly of the patient's mouth in the clamp 40 to project downwardly toward the lower bow clamp 102.

Movements of the three styli 20, 22 and 104 relative to the lower dentition 70 as the jaw 98 moves are recorded in three bodies 106, 108 and 110 of a suitable recording medium in a plastic state, which are supported on the lower dentition 70 to engage the respective styli. While the invention is not necessarily limited to the use of any particular material as the recording medium in the bodies 106, 108, 110, it has been found that litharge in its plastic state can be used for this purpose. Any other material used for this purpose should be readily deformable to form styli tracings which are three-dimensional and have a substantially permanent, firm character.

The body 110 of plastic material which coacts with the stylus 104 is supported, as shown in FIGS. 3 and 4, in a forward tray 112 on the lower bow clamp 102. To provide support for the recording medium bodies 106, 108 the reference element supports 80 are removed from the clamps 78 and the clamps adjusted into the positions shown in FIG. 4. A third pair of rearwardly extending support elements 114, 116 are substituted into the clamps 78 to extend rearwardly in spaced relation to each other to support a pair of trays 118, 120 for containing the respective recording medium bodies 106, 108.

Engagement of the two styli 20, 22 with the recording medium bodies 106, 108 makes a permanent recording by means of styli tracings in the bodies 106, 108 of the position of the jaw hinge axis. The dentist moves the jaw 98 through meanful patterns of movement which produce tracings of the three styli 20, 22 and 104 in the recording medium bodies 106, 108 and 110 which record the movements or kinematic action of the jaw relative to the upper dentition 26.

Representations of stylus tracings of such movements of a jaw having normal patterns are shown in FIG. 11, the tracings in the respective recording bodies 106, 108 and 110 being identified in this figure by the reference numerals 122, 124 and 126.

Deviations of the styli tracings from the normal pattern illustrated in FIG. 11 indicates to the dentist the manner and the degree to which movements of the jaw depart from what may be characterized as normal or proper jaw movements. Study of such tracings is immensely helpful in diagnostic evaluation of dental and jaw ailments and in prescribing corrective measures.

Figure 13:
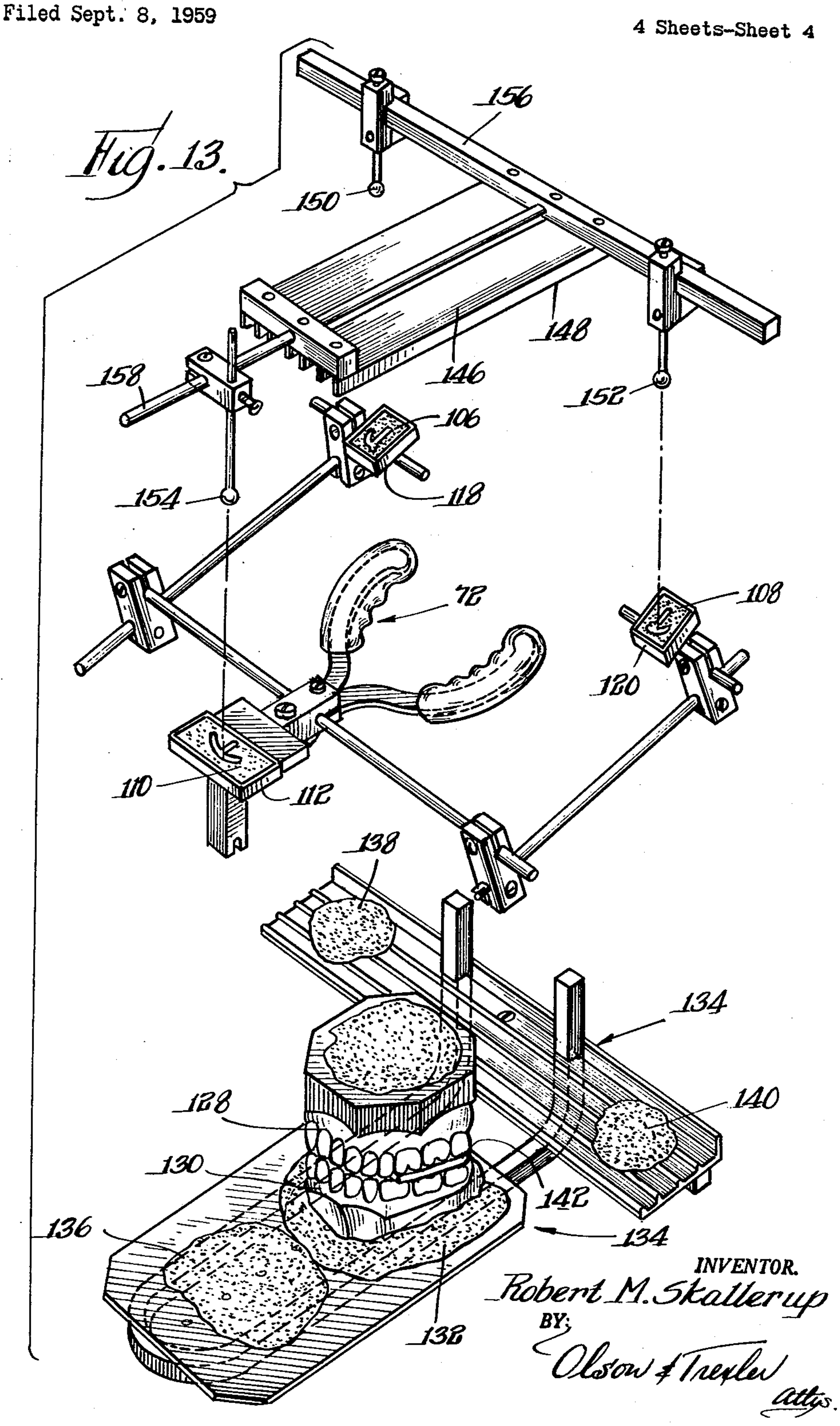
FIG. 13 is a vertically exploded view of the structural assemblage of FIG. 12.

The three dimensional styli tracings thus produced are useful in artificially reproducing by means of models the relative kinematic action of the upper and lower dentition 26, 70 of the patient. For this purpose, plaster models 128, 130, FIGS. 12 and 13, are made of the patient's upper and lower dentition 26, 70. These models are made in a conventional manner.

The three recording medium bodies 106, 108 and 110 are removed from the patient's mouth by releasing the lower dental clutch 72 from the lower dentition 70 and are remounted on the model 130 of the lower dentition in positions relative to the model 130 which duplicate the original positions of the bodies relative to the lower dentition 70. This remounting of the recording medium bodies on the model 130 is accomplished by clamping the clutch 72 to the model 130. As previously described, the clutch 72 receives an impression of the lower dentition 70. This impression on the clutch 72 is used to effect a relocation of the clutch on the model 130 which effects the desired positioning of the plastic medium bodies on the model.

The positional relationship of the plastic medium bodies 106, 108 and 110 relative to the model 130 is rigidly fixed, as shown in FIG. 12, by seating the model 130 in a bed of hardenable plaster 132 on a rigid reinforcing frame 134, which supports beds of plaster 136, 138 and 140 in underlying supporting relation to the plastic body containing trays 112, 118 and 120.

The model 128 of the upper dentition 26 is located in relation to the model 130 to duplicate the positional relationship of the upper and lower dentition of the patient's mouth by means of bite impressions 142 (only one of which is shown in FIGS. 12 and 13) taken of the upper and lower dentition in hinge axis relation and interposed between the upper and lower teeth on opposite sides of the models.

The model 128 of the upper dentition is secured by hardenable plaster 144 to a grooved mounting plate 146 on a swingable articulating element indicated generally by the number 148.

Three styli 150, 152 and 154 corresponding to the respective styli 20, 22 and 104 previously mentioned are mounted on the articulator element 148 and adjusted into positions relative to the model 128 which duplicate the positions of the styli 20, 22 and 104 relative to the patient's upper dentition 26. Thus, as shown, the two styli 150, 152 are adjustably mounted on a transverse support bar 156 secured to the rear end of the plate 146, and the stylus 154 is adjustably mounted on a rod 158 projecting forwardly of the plate 146.

With the articulator element 148 supported on the model 128 as described, and with the model 128 located relative to the model 130 by means of the bite impressions 142, the styli 150, 152 and 154 are adjusted to fit into portions of the respective styli tracings 122, 124 and 126 corresponding to the positional relationship of the patient's upper and lower dentition in making the bite impressions 142.

To duplicate by means of the models 128, 130 the relative kinematic action of the patient's upper and lower dentition which produced the styli tracings 122, 124 and 126, it is necessary merely to manipulate the model 128 relative to the model 130 while moving the styli 150, 152 and 154 along corresponding portions of the styli tracings.

This artificial and extremely accurate reproduction of the kinematic relative action of the upper and lower dentition of the patient is an advantageous aid to the dentist and dental technician in devising therapeutic measures and corrective devices for the patient. It provides a means for studying, with the models of the dentition in full view, the actions which are most significant to the dentist.

Moreover, dentures, bridges, and the like may be mounted on the models 128, 130 and finally shaped and fitted, before being inserted in the patient's mouth. This eliminates the necessity for protracted and tedious working in the patient's mouth to achieve the desired fit, which can be accomplished only by taking into account the kinematic action of the upper and lower dentition relative to each other.

It will be understood that the invention is not necessarily limited to use of the exact construction illustrated, but includes a practice of the invention using variants and alternatives within the scope of the invention as defined by the claims.

The invention is claimed as follows:

1. The method of artificially reproducing the kinematic action of the upper and lower dentition of a person, comprising, firmly mounting a pair of styli on one dentition of the opposing upper and lower dentition of a person to occupy positions on opposite sides of the head of the person in general alinement with the hinge axis of the jaw, firmly mounting a pair of reference elements on the other dentition of the person to occupy positions in general alinement with the respective styli, manipulating the jaw of the person and adjusting the positions of the styli relative to the one dentition to occupy positions which do not move relative to the reference elements upon slight pivoting of the jaw about its hinge axis in the vicinity of its convenience position, firmly mounting on said other dentition two bodies of a motion recording medium in a plastic state to occupy positions with reference to the respective styli in which the styli penetrate the respective bodies to a substantial depth, manipulating the jaw of the person to produce three-dimensional traces of the styli in the bodies of motion recording medium, firmly mounting the recording medium bodies on a model of said other dentition to duplicate relative to the model the original positional relationships of the bodies to said other dentition, firmly mounting styli on a model of said one dentition to duplicate relative to the last mentioned model the positional relationship of the styli relative to the one dentition, and manipulating the two models relative to each other with the styli in the styli traces in the respective bodies to accurately reproduce the kinemetic action of the upper and lower dentition of the person.

2. The method of artificially reproducing the kinematic action of the upper and lower dentition of a person, comprising, clutching a first bow to one dentition of the opposing upper and lower dentition of the person to support a pair of styli on opposite sides of the head of the person in general alinement with the hinge axis of the jaw, clutching a second bow to the other dentition of the person to support a pair of reference elements in general alinement with said respective styli, manipulating the jaw of the person and adjusting the positions of the styli on the first bow to occupy positions which do not move relative to the reference elements upon slight pivoting of the jaw about the hinge axis thereof toward and away from the convenience position of the jaw, firmly clutching to said other dentition a bow assembly supporting two bodies of a motion recording medium in a plastic state in positions relative to the respective styli in which the styli penetrate the respective bodies to a substantial depth and supporting a third plastic recording medium body in a position ahead of the jaw of the person, supporting a third styli on the first bow to engage and extend a substantial distance into the third recording medium body when the jaw is in the convenience position thereof, manipulating the jaw of the person to produce traces of the three styli in the respective recording medium bodies, firmly mounting the three recording medium bodies on a model of said other dentition to duplicate relative to the model the original positional relationships of the bodies to said other dentition, firmly mounting styli on a model of the one dentition to duplicate relative to the second mentioned model the positional relationship of the three styli to the one dentition, and manipulating two models relative to each other while moving the styli through the three-dimensional traces in the bodies to accurately reproduce the kinematic action of the upper and lower dentition of the person.

3. The method of precisely locating the hinge axis of the jaw of a person, comprising clamping to one dentition of the opposing upper and lower dentition of a person a bow to support hinge axis locating elements on the bow on opposite sides of the head of the person in general alinement with the hinge axis of the jaw while at the same time providing for location of the jaw in its convenience position in which the upper and lower dentition are in virtual occlusion, clamping a second bow to the other dentition of the person to extend along opposite sides of the head of the person while at the same time providing for location of the jaw in its convenience position in which the upper and lower dentition are in virtual occlusion, simultaneously manipulating the jaw and amplifying the movements of the axis locating elements on the first bow relative to adjacent structure supported on the second bow, and adjusting the positions of the hinge axis locating elements on the first bow to eliminate movement of the axis locating elements relative to the adjacent structure on the second bow upon limited swinging movement of the jaw about the hinge axis thereof toward and away from the convenience position of the jaw.

4. The method of artificially reproducing the relative movements of the upper and lower dentition of a person, comprising, firmly mounting on one dentition of the opposing upper and lower dentition of a person a pair of styli to occupy positions on opposite sides of the head of the person in general alinement with the hinge axis of the jaw, firmly mounting on the other dentition of the person two thick bodies of a motion recording medium in a plastic state to occupy positions relative to the respective styli which cause the styli to penetrate substantially into the respective bodies of recording medium, manipulating the jaw of the person to produce three-dimensional traces of the styli in the recording medium bodies, firmly mounting said recording medium bodies on a model of said other dentition to duplicate relative to the model the original positional relationship of the bodies to said other dentition, firmly mounting styli on a model of the one dentition to duplicate relative to the last mentioned model the positional relationship of the styli relative to the one dentition, and locating the styli in the styli traces in the recording medium bodies and manipulating the two models relative to each other while moving the styli along the traces to accurately reproduce the kinematic action of the upper and lower dentition of the person.

5. The method of artificially reproducing the relative kinematic action of the upper and lower dentition of a person, comprising, firmly mounting a pair of styli on one of the upper and lower dentition of a person by means of a first lightweight bow, locating the styli on opposite sides of the head of the person in general alinement with the hinge axis of the jaw, firmly mounting two thick bodies of a readily deformable medium on the other dentition of the person by means of a second lightweight bow supporting the bodies in positions relative to the respective styli which cause the styli to extend substantially into the respective bodies manipulating the jaw of the person to produce three-dimensional traces of the styli in the respective bodies, removing said second bow from the other dentition and positioning the second bow on a model of the other dentition to duplicate relative to the model the positional relationship of the bodies relative to the other dentition, applying rigid reinforcing means to the model and to the respective bodies to rigidly fix the positional relationship of the bodies to the model, locating a model of the one dentition in relation to the model of the other dentition to duplicate a natural positional relationship of the upper and lower dentition of the person, rigidly securing a strong articulating element to the model of the one dentition, adjusting styli on said articulating element to fit into the styli traces on the bodies, and manipulating the two dentition models relative to each other while moving the styli on the articulating element along the styli traces.

6. For use in precisely locating the hinge axis of the jaw of a person, a dental clutch adapted to clamp firmly on one dentition of the upper and lower dentition of a person, a first bow supported on said first clutch and including spaced supports adapted to extend along opposite sides of the head of the person, a pair of ball elements adjustably mounted on said support elements to be positioned in alinement with the hinge axis of the jaw of the person, a second dental clutch adapted to be firmly secured to the other dentition of the person, a second bow supported on said second clutch and including a pair of spaced support elements extending rearwardly into general alinement with said ball elements, a pair of permanent magnet elements defining concave seats adapted to engage said respective ball elements, universal joint means mounting said respective magnet elements on said respective support elements of said second bow, extended pointer elements connected to said respective magnet elements for movement therewith, and reference elements mounted on said second bow in proximate relation to said pointer elements to indicate the instantaneous positions of the latter relative to said reference elements.

7. The method of artificially reproducing by means of models the relative kinematic action of the upper and lower dentition of a person, comprising, securing to one dentition of the opposing upper and lower dentition of a person a first dental clamp, supporting a pair of styli on the clamp in locations on oposite sides of the head of the person which are in general alinement with the hinge axis of the jaw, securing to the other dentition of the person a second dental clamp capable of receiving an impression of said other dentition, supporting a pair of reference elements on the second clamp in general alinement with said respective styli, manipulating the jaw of the person and adjusting the positions of said styli on said one dentition to occupy positions which do not move relative to said reference elements upon slight pivoting of said jaw about the hinge axis thereof, mounting on said second clamp means for supporting two bodies of a motion recording medium in a plastic state in positions relative to the respective styli which cause the styli to penetrate substantially into recording bodies, manipulating the jaw of the person to produce three-dimensional traces of the styli in the respective recording medium bodies, removing the second clamp from said other dentition and reapplying the second clamp to a model of the other dentition to duplicate relative to the model the original positional relationships of the bodies to the other dentition, firmly mounting two styli on a model of said one dentition to duplicate relative to said last mentioned model the positional relationship of the styli to said one dentition, and manipulating the two models relative to each other while moving the styli on the model of said one dentition through the three-dimensional traces in said bodies to accurately reproduce the kinematic action of the upper and lower dentition of the person.

8. For use in precisely locating the hinge axis of the jaw of a person, a first dental clutch adapted to be firmly secured to one dentition of the upper and lower dentition of a person, a first bow supported on said first clutch and including two spaced support elements adapted to extend rearwardly along opposite sides of the head of the person, a pair of jaw hinge axis locating elements, adjustable means supporting said locating elements on said respective support elements of said first bow for adjustment into alinement with the hinge axis of the jaw of the person, a second dental clutch adapted to be firmly secured to the other dentition of a person, a second bow supported on said second clutch and including two spaced support elements adapted to extend rearwardly into general alinement with said axis locating elements, two motion amplifying elements adapted to articulate with said axis locating elements, universal pivotal support means connecting said respective motion amplifying elements to said respective support elements of said second bow, and motion indicating means coacting with said motion amplifying elements to indicate pivotal movement thereof.

9. For use in locating the hinge axis of the jaw of a person, the combination of a first dental clutch adapted for attachment to one of the upper and lower dentition of a person, two support elements supported on said first clutch to extend rearwardly in laterally spaced relation to each other to embrace the head of the person; each support element including a support part mounted thereon for movement along a linear path, resilient means coacting with said support part to urge the latter in one direction along said path, and a threaded abutment element engaging said movable support part to effect location of the latter in adjusted positions along said path determined by the adjustment of said threaded abutment element; a pair of jaw hinge axis locating elements, threaded means supporting said respective axis locating elements on said support parts of said respective support elements for adjustment in directions generally perpendicular to said respective paths, a second dental clutch adapted for attachment to the other dentition of the person, and a pair of reference elements supported on said second clamp in laterally spaced relation to each other for alinement with said respective hinge axis locating elements to determine relative movement of said hinge axis locating elements relative to said reference elements upon swinging movement of said clutches relative to each other.

10. For use in precisely locating the hinge axis of the jaw of a person, the combination of a first dental clutch adapted for attachment to one dentition of the upper and lower dentition of a person, first bow means mounted on said first clutch and including two support elements extending rearwardly in laterally spaced relation to each other, a pair of hinge axis locating ball elements, fine adjustment means supporting said respective ball elements on said respective support elements for fine adjustment relative to said first clamp, a second dental clutch adapted for attachment to the other dentition of the person, second bow means supported on said second clutch and including two support elements extending rearwardly in laterally spaced relation to each other, two magnets each having a pole face, a shaped wire mounted on said pole face of each magnet to define a socket adapted for engagement with a coacting one of said ball elements by the magnetic attraction of the coacting magnet, flexible mounting elements supporting said respective magnets on said respective support elements of said second bow means for universal pivotal movement relative to said last mentioned support elements, elongated pointer elements connected to said respective magnets for movement therewith, and target elements mounted on one of said bow means in coacting relation with said respective pointer elements to indicate pivotal movement of the latter upon swinging movement of said clutches relative to each other.

11. For use in locating the hinge axis of the jaw of a person, the combination of a first dental clamp adapted for attachment to one of the upper and lower dentition of a person, two support elements supported on said first clamp to extend rearwardly in laterally spaced relation to each other to embrace the head of the person; each support element including a support part adjustable along a generally linear path and a threaded adjusting element coacting with said support part to adjust the latter progressively along said path, a pair of jaw hinge axis locating elements, threaded means supporting said respective axis locating elements on said respective support parts for adjustment in directions generally perpendicular to said paths of adjustment of said respective support parts, a second dental clamp, and a pair of support elements supported on said second clamp and extending rearwardly therefrom in laterally spaced relation to each other, a pair of motion indicating elements engageable with said hinge axis locating elements to follow movements thereof, and universal pivot means supporting said respective indicating elements on said respective support elements on said second clamp.

12. For use in precisely locating the hinge axis of the jaw of a person, the combination of a first dental clamp adapted for attachment to one dentition of the upper and lower dentition of a person, first bow means mounted on said first clamp and including two support elements extending rearwardly in laterally spaced relation to each other, a pair of hinge axis locating ball elements, fine adjustment means supporting said respective ball elements on said respective support elements for fine adjustment relative to said first clamp, a second dental clamp adapted for attachment to the other dentition of the person, second bow means supported on said second clamp and including two support elements extending rearwardly in laterally spaced relation to each other, two socket elements shaped to fit against said respective ball elements to follow movements thereof, and two universal pivot mounts supporting said respective socket elements on said respective support elements of said second bow means for universal pivotal movement relative to said last mentioned support elements while engaged with said respective ball elements.

13. The method of artificially reproducing the relative movements of the upper and lower dentition of a person, comprising, mounting three styli on one of the upper and lower dentition of a person by means which supports two of the styli in general alinement with the hinge axis of the jaw of the person and which supports one of the styli forwardly of the jaw while at the same time providing freedom for occlusion of the upper and lower dentition, mounting three thick bodies of a tracing medium in a plastic state on the other dentition of the person by means which provides for occlusion of the upper and lower dentition while at the same time supporting the three bodies in positions relative to the respective styli which cause the styli to penetrate substantially into the respective bodies when the jaw of the person is located in its convenience position bringing the upper and lower dentition near occlusion, manipulating the jaw in its convenience position to produce three-dimensional traces of the respective styli in the corresponding bodies of tracing medium, transferring said three tracing medium bodies to a model of the other dentition of the person to duplicate relative to the model the original positional relationships of the bodies to the other dentition of the person to duplicate relative to the last mentioned model the positional relationship of the three styli relative to the one dentition, locating the styli on the last mentioned model in the three-dimensional traces in the respective recording medium bodies, and manipulating the two models relative to each other while moving the three styli on the model of the one dentition through the three-dimensional traces in the respective recording bodies to accurately reproduce the kinematic action of the upper and lower dentition of the person in the vicinity of occlusion of the upper and lower dentition.

14. The method of artifically reproducing the relative movements of the upper and lower dentition of a person, comprising, mounting three styli on one of the upper and lower mouth structures of the person by means which supports two of the styli along the hinge axis of the jaw of the person and which supports the third styli in a forward position while at the same time providing for location of the jaw in its convenience position in which the upper and lower mouth structures are located substantially in dentition occluding relation to each other, mounting three thick recording bodies in a plastic state on the other of the upper and lower mouth structures of the person by means which provides for location of the jaw in its convenience position while at the same time supporting the three recording bodies in positions relative to the respective styli which cause the styli to penetrate substantially into the respective bodies, manipulating the jaw in its convenience position to produce three-dimensional traces of the styli in the respective recording bodies, removing the three recording bodies from the person and firmly positioning the bodies in relation to a model of said other mouth structure of the person to duplicate relative to the model the original positional relationships of the recording bodies to the other mouth structure, mounting three styli on a model of the one mouth structure of the person to duplicate relative to the last mentioned model the positional relationships of the styli relative to the one mouth structure, locating the styli on the model of the one mouth structure in the three-dimensional tracings in the respective recording medium bodies, and manipulating the two models relative to each other while moving the styli on said last mentioned model through the three-dimensional traces in the corresponding recording bodies to accurately reproduce the kinematic action of the upper and lower mouth structures of the person when the structures occupy positions corresponding to a substantially occluding relationship of the upper and lower dentition of the person.

15. The method of artificially reproducing the relative movements of the upper and lower dentition of a person, comprising, mounting three recording styli on one of the upper and lower dentition of a person by bow and dental clamp means which support two of the styli in general alinement with the jaw hinge axis of the person and which supports the third styli in a forward position while at the same time providing for movement of the jaw of the person in its convenience position in which the upper and lower dentition of the person are in the vicinity of occluding relation to each other, supporting three relatively thick recording medium bodies in a plastic state on the other dentition of the person by means of second bow and dental clamp means which receives an impression of the other dentition and which supports the recording bodies in positions relative to the respective recording styli which causes the styli to penetrate substantially into the corresponding recording bodies while at the same time providing for movement of the jaw in its convenience position in which the upper and lower dentition are in the vicinity of occlusion, manipulating the jaw of the person in its convenience position with the upper and lower dentition in the vicinity of occlusion to form three-dimensional traces of the respective styli in the corresponding recording bodies, releasing said second bow and dental clamp means from the other dentition by releasing the dental clamp means thereof from the other dentition, reapplying said second bow and clamp means to a model of said other dentition to duplicate relative to the model the original positional relationships of the three recording medium bodies to the other dentition, mounting three styli on a model of the one dentition to duplicate relative to the last mentiond model the position relationships of the styli relative to the one dentition, locating the styli on said last mentioned model in the three-dimensional traces in the respective recording medium bodies, and manipulating the two models relative to each other while moving the styli on the model of the one dentition through the three-dimensional traces in the recording medium bodies to accurately reproduce the kinematic action of the upper and lower dentition of the person in the vicinity of occlusion.

16. The method of artificially reproducing the relative movements of the upper and lower dentition of a person, comprising, mounting two recording styli on one of the upper and lower dentition of a person by means which supports the styli in general alinement with the hinge axis of the person while at the same time providing for movement of the jaw of the person in its convenience position in which the upper and lower dentition of the person are in the vicinity of occluding relation to each other, supporting two relatively thick recording medium bodies in a plastic state on the other dentition of the person by means of a bow secured to the other dentition by a dental clamp which receives an impression of the other dentition and supports the recording bodies in positions relative to the respective recording styli which causes the styli to penetrate substantially into the corresponding recording bodies while at the same time providing for movement of the jaw in its convenience position in which the upper and lower dentition are in the vicinity of occlusion, manipulating the jaw of the person in its convenience position with the upper and lower dentition in the vicinity of occlusion to form three-dimensional traces of the respective styli in the corresponding recording bodies, releasing the dental clamp from the other dentition to remove the bow from said other dentition while maintaining the positions of the recording bodies relative to the bow, applying the dental clamp to a model of said other dentition to support the bow on the model to duplicate relative to the model the original positional relationships of the recording medium bodies to said other dentition, mounting two styli on a model of said one dentition to duplicate relative to the last mentioned model the positional relationships of the styli relative to said one dentition, locating the styli on said last mentioned model in the three-dimensional traces in the respective recording medium bodies, and manipulating the two models relative to each other while moving the styli on the model of said one dentition through the three-dimensional traces in the recording medium bodies to accurately reproduce the kinematic action of the upper and lower dentition of the person in the vicinity of occlusion.

References Cited in the file of this patent

UNITED STATES PATENTS

| | | |
|---|---|---|
| 2,418,648 | Kile | Apr. 8, 1947 |
| 2,434,415 | Kile | Jan. 13, 1948 |
| 2,814,876 | Stuart | Dec. 3, 1957 |
| 2,829,435 | Kazis et al. | Apr. 8, 1958 |